Figure 1:
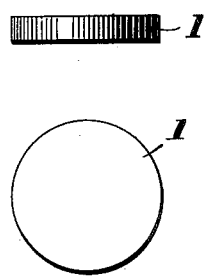

L. E. HOOKER.
METHOD OF MANUFACTURING CARTRIDGE SHELLS.
APPLICATION FILED SEPT. 17, 1908.

922,585.

Patented May 25, 1909.

Witnesses
J. G. Stinkel
Prescott S. Tucker

Inventor
L. E. Hooker
by Howard A. Coombs
his Attorneys

UNITED STATES PATENT OFFICE.

LESLIE E. HOOKER, OF PAWTUCKET, RHODE ISLAND.

METHOD OF MANUFACTURING CARTRIDGE-SHELLS.

No. 922,585.        Specification of Letters Patent.        Patented May 25, 1909.

Application filed September 17, 1908. Serial No. 453,419.

*To all whom it may concern:*

Be it known that I, LESLIE E. HOOKER, a citizen of the United States, residing at Pawtucket, in the county of Providence and State of Rhode Island, have invented certain new and useful Improvements in Methods of Making Cartridge-Shells, of which the following is a specification.

My invention consists in an improved method of making tubes, especially for use in the manufacture of cartridge shells, in which the operations of drawing and extruding the metal are combined in such a manner as to produce a cartridge shell both of better quality and at less cost than has been heretofore possible.

According to the method disclosed in the patent granted to George W. Lee, June 5th, 1906, No. 822,285, a planchet of metal is cut from sheet stock, and placed in a die of the same diameter as the planchet. A plunger, having a short former projecting centrally therefrom, is then brought down upon the planchet, and the former penetrates the metal at the center of the planchet, the result of which is to cause the outer portions of the same to rise in the die so as to form a cup. Then, the bottom surface of the plunger proper squeezes the metal inwardly and downwardly around said former, thus forming a closed-end tube by the process of extrusion. In practice, I find that the method disclosed in said patent, while suitable for some tubes where great strength is not required, is not adapted to the manufacture of tubes for modern military cartridges, as it does not produce shells of requisite strength to enable them to be reloaded a number of times and still withstand the very high pressures required. The reason for this fact I have ascertained to be that, when starting with a flat disk, the first action of the plunger is to crush and separate the grain of the metal, whereby the structure of the same is injured. When a disk is cut out of sheet stock, it may be considered as having the grain of the metal as running in one direction across the same, and when the punch forces down the center of such a disk it acts, partially at least, to shear the metal across to the grain, leaving the grain running parallel to the top of the wall, instead of longitudinally of the wall. Furthermore, in the ordinary method of drawing closed-end tubes, by which method cartridge cases are usually made, the planchet is cupped gradually and is reduced in diameter at the same time that the tube is elongated. By this method, the end of the shell, which eventually becomes the head of the cartridge case, is more or less strained at its intersection with the walls during each step of the operation and each successive reduction in the diameter of the cup bends the metal upwardly at practically a right angle, and wherever this bend occurs in the walls of the finished shell there must necessarily be such a weakening in the grain of the metal, as will eventually, under the strain of expansion and contraction, experienced in repeated firing of reloaded cartridge cases, cause the shell to rupture. If a shell is reduced from the planchet in five (5) draws, there must necessarily be four (4) zones of weakness occurring at more or less regular intervals and extending transversely around the shell.

I have discovered that these objections can be obviated and a shell of the requisite strength be made by extrusion by preliminarily forming a cup of the metal by drawing it up from a disk of larger diameter. The grain of the metal in this cup runs longitudinally of the wall, and when such cup is placed in the die and the plunger is brought down into it, the metal starts to flow downwardly into the die in a direction longitudinally of the grain, the metal in the bottom of the cup being simply forced down into the die without being strained, the impact of the former at the beginning of the stroke being simply for the purpose of preventing the metal from flowing inwardly underneath the former. By this method it will be seen that there is a straight flow of metal with the grain of the sheet from the beginning to the end of the stroke, thereby producing a shell of uniform texture throughout. By this method, the zones of weakness which necessarily occur in the ordinary method of making closed-end tubes are entirely eliminated, the metal being of uniform grain from the head of the shell to the mouth thereof. This is of great importance in cartridge making, and especially in the manufacture of military cartridges, as the breaking of a shell transversely in the chamber of the rifle for the time being disables the arm, and the broken shell is often extracted with a good deal of difficulty, even where proper appliances are provided.

Experience has proven that the military cartridges produced by my method do not break transversely, even under the most severe tests by repeated reloading, and owing to the uniformity of grain, the weight of metal in each cartridge case may, if desired, be materially reduced.

Figure 2:
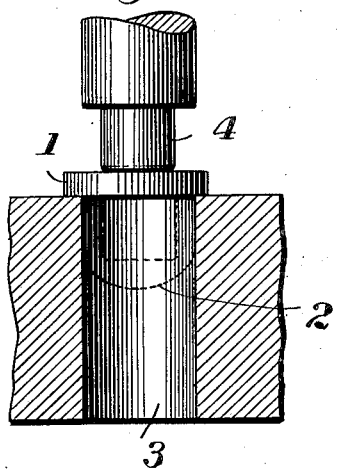
Figure 3:
Figure 4:
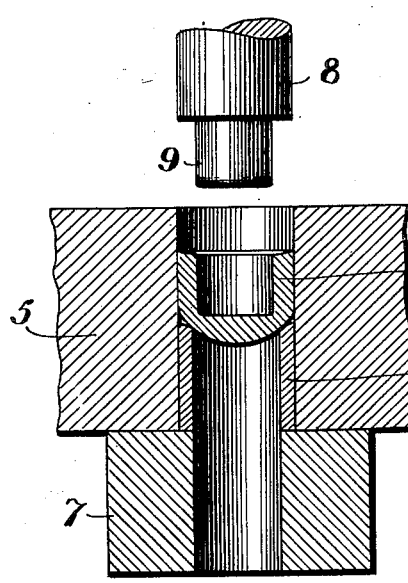
Figure 5:
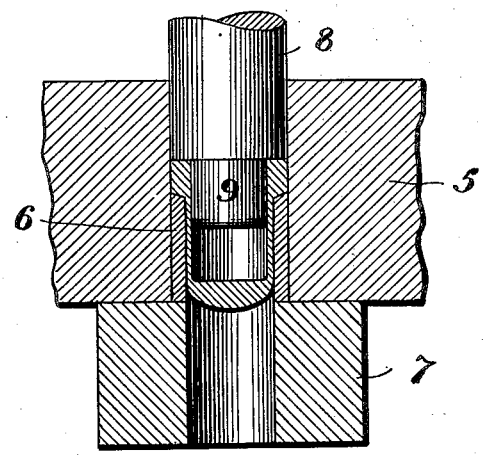

The steps of the new method are illustrated in the accompanying drawing in which:

Figure 1 shows in elevation and plan the blank as it is cut from the sheet; Fig. 2 shows the punch and die for cupping the blank; Fig. 3 shows the cup formed therefrom; Fig. 4 shows the die and punch by which the tube is extruded, and Fig. 5 shows the same in the operation of extruding the shell.

The planchet 1 is cut out from sheet stock. If of hard metal, such as brass, it is then annealed, whereupon it is formed into the cup 2 by means of the die 3 and plunger 4, its edges being turned upwardly around the plunger. The cup 2 thus formed is preferably of the same inside diameter as the shell to be made therefrom and the walls are or may be reduced in thickness, leaving the bottom of substantially the same thickness as the stock; the cup is then placed in the extruding die, which consists of a steel block 5, having a straight aperture therethrough, and a hardened bushing 6, the inside diameter of which is equal to the outside diameter of the shell, and which is forced into the block 5 and supported by the hardened plug 7. The plunger 8, having the central former 9, which is of the diameter of the shell to be formed and fits within the cup, is then brought down, the bottom of the former 9, striking the bottom of the cup at the same time as the bottom of the plunger 8 strikes the top of the wall of the cup. The first effect is to cause the metal of the wall of the cup to expand so as to tightly fill the annular space between the former and the die. The metal is then forced to flow down into the die around the former, the thrust coming upon the end of the grain of the metal instead of transversely thereto. By looking at Fig. 5, it will be seen that the metal, in flowing downwardly, does not have to make any sharp turns. The shells thus made are finished in the usual manner.

What I claim is—

1. The method of making closed end tubes for use in the manufacture of cartridge shells which consists in forming a cup from sheet stock, annealing the same, placing said cup in an extruding die of the same diameter and extruding the metal thereof by means of a plunger of the same diameter as said die and having a central former of the same diameter as the inside of the cup.

2. The method of making closed end tubes for use in the manufacture of cartridge shells, which consists in cutting a planchet from sheet stock, annealing and cupping the same by turning its edges upwardly so as to form a cup having the internal diameter of the shell to be formed, placing said cup in an extruding die and extruding the metal thereof by means of a plunger of the same diameter as said die and having a central former of the same diameter as the inside of the cup.

3. The method of making closed end tubes for use in the manufacture of cartridge shells, which consists in cutting a planchet from sheet stock, forming the same into a cup of smaller external diameter than said planchet, and elongating the same to form a tube by simultaneously applying pressure on the top of the wall thereof, and limiting the flow of the metal toward the center.

4. The method of making closed end tubes for use in the manufacture of cartridge shells, which consists in cupping a blank by turning its edges upwardly, placing said cup in a die, and extruding the metal thereof to form an elongated, closed-end tube by applying pressure to the top of the wall of said cup and causing the same to flow down and around a former having the diameter of the inside of the shell to be formed.

In testimony whereof I have affixed my signature, in presence of two witnesses.

LESLIE E. HOOKER.

Witnesses:
BEDA J. FRIBERG,
STANLEY N. CHASE.